United States Patent Office 2,740,733
Patented Apr. 3, 1956

2,740,733
METHOD FOR THE RECOVERY OF SWEET CORN POLYSACCHARIDES

Rolland L. Lohmar, Jr., and George E. Lauterbach, Peoria, Ill., assignors to the United States of America as represented by the Secretary of Agriculture No Drawing. Application January 6, 1953,
Serial No. 329,935

5 Claims. (Cl. 127—34)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to methods for producing sweet corn polysaccharides; particularly to methods involving the extraction of sweet corn polysaccharides with aqueous solvents and the subsequent recovery of the saccharide from the extract.

Sweet corn polysaccharides occur in the kernels of sweet corn in varying proportions, depending upon the state of maturity and the variety. They do not normally occur in granule form, are soluble in cold or hot water, and form rather opaque aqueous solutions of fairly low viscosity. They find use as materials for intravenous feeding and other pharmaceutical and food purposes.

Heretofore, the extraction and recovery of sweet corn polysaccharides has involved the use of trichloroacetic acid as a substance in separating the polysaccharides from the protein. For example, the ground sweet corn grain has been extracted with a 10 percent solution of trichloroacetic acid, or an aqueous extract has been treated with trichloroacetic acid for the purpose of inhibiting the solution of protein or, in the latter case, precipitating extracted protein. The extracts produced in either of these two ways have then been treated with ethanol to precipitate out the polysaccharides which may be recovered by filtration, centrifugation or other similar means.

The use of trichloroacetic acid in the prior processes has been considered necessary in order to prevent contamination of the recovered polysaccharide by excessive amounts of protein or other nitrogenous material. The action of trichloroacetic acid upon the extractable protein is rather specific, and its use has not been dispensible heretofore despite the relatively high cost of the acid, and despite its extreme corrosiveness.

According to the present invention sweet corn, preferably in a relatively fine state of comminution, is extracted with an aqueous solvent which is essentially inert to the polysaccharide, as for example, water, and the extract, which contains dissolved polysaccharide, sugars, salts and a considerable amount of protein is then subjected to heat and pressure in such a manner that a large proportion of dissolved protein is coagulated and precipitated. The required conditions for accomplishing this will be explained in detail in the following specification.

After separation of coagulated protein, the remaining solution is then rendered alkaline to a pH of approximately 8 to 10, and a lower aliphatic alcohol is added to precipitate the polysaccharide. In order to obtain polysaccharide uncontaminated by nitrogenous impurities, we have found that it is necessary to make the alkaline pH adjustment previously noted, for it is only under these specified conditions that dissolved protein, not coagulated by the heat treatment, will remain in solution during the alcohol precipitation of the polysaccharide.

Although this invention is directed primarily to the extraction and recovery of intermediate polysaccharide from sweet corn, it is to be understood that the principles of the invention may be applied to other varieties and types of corn or cereal grain containing such water extractable polysaccharides. However, inasmuch as sweet corn contains these particular polysaccharides in relatively large proportions, and is furthermore one of the most likely commercial sources for such substances, the invention will be described with particular reference to the employment of sweet corn. The term "sweet corn" as used herein, refers to the vegetable corn commonly known as sweet corn or sugar corn.

The conditions of extraction may vary widely. The specific nature of the extracting aqueous solvent is not critical so long as it is essentially aqueous in character and is inert to the polysaccharides under the conditions of the extraction. Since this invention provides a simple and convenient method for removing dissolved proteins from the aqueous extract, it is not necessary that the solvent be selective for the polysaccharides. Thus, the use of the prior corrosive trichloroacetic acid solvents is rendered completely unnecessary, and we may use instead, any suitable solvent which will efficiently extract the polysaccharides from the corn even though the solvent might also dissolve proteins during the extraction. Because of its cheapness and ease of handling, we prefer plain water as extracting solvent.

Preferably the ground corn is extracted, either batchwise or counter-currently, until a contact time of from 15 minutes to one hour is effected. Shorter or longer times may be employed to achieve maximum extraction efficiency, the time varying generally inversely with the quantity of extractant used. Batchwise extraction with a weight ratio of about 3:1 of extractant to ground corn will accomplish substantially complete extraction in about 30 minutes. The temperature of extraction may vary rather widely. We prefer temperatures around normal room temperature, within the range of 15° to 25° C.

After the extraction step, the extract is separated by filtration and may be given the heat treatment immediately. The temperature of treatment may vary from 110° C. to 140° C., or higher and the pressure from 5 pounds per square inch gauge up to 40 pounds per square inch gauge. The pressure employed need not exceed the autogenic pressure, and the coagulation may be accomplished conveniently in an autoclave or similar pressure vessel provided with communicating access to saturated steam under pressure. The time required for coagulation may vary considerably, for example from 15 minutes to 3 hours—the higher the temperature, the less time required for coagulation. Autoclaving at 15 pounds per square inch gauge will produce satisfactory results in about 30 minutes: although longer periods are not harmful. The sufficiency of the coagulation may be readily observed visually, for the coagulated protein occurs as brown curds which may be separated readily by filtration or centrifugation.

The solution from which coagulated protein has been removed is then adjusted to pH 8.0 to 10.0 with any suitable soluble alkali, whereupon ethanol is added to render the ethanol content of the solution approximately 55 to 65 percent. The polysaccharide is precipitated at this stage in the form of a white flocculent substance which may be separated readily by filtration. Its nitrogen content is less than 0.1 percent and usually less than 0.05 percent. Other lower aliphatic alcohols may replace ethanol, as for example methanol or isopropanol. If it is desired to lower the ash content of the polysaccharide, this is readily accomplished by washing the polysaccharide with aqueous alcohol containing a small proportion of an acid such as hydrochloric acid.

The polysaccharide obtained in accordance with this invention is of higher purity than that obtainable through the use of the trichloroacetic acid extraction procedure previously described. In addition to the more obvious advantages of economics and improved products, the process has the further advantage of requiring only conventional type of equipment and eliminating the necessity for installations highly resistant to corrosion.

*Example*

Sweet corn of the Golden Bantam variety was ground to 10 mesh and extracted with 300 ml. of water per 100 g. of corn. The extraction was carried out at room temperature for about 0.5 hour, whereupon the extract was expressed through cloth and the residual corn re-extracted in a similar manner with about 150 ml. of water per 100 g. of corn, dry basis, and this extract also expressed through cloth. The two extracts were combined and centrifuged to separate fine sediment. The supernatant solution had a pH of 6.2 to 6.7, and was autoclaved without adjustment at 15 p. s. i. for 2 hours. The autoclaved solution was decanted from precipitated material and sufficient potassium hydroxide added to render the pH about 9.0. This alkaline solution was then centrifuged to remove sediment, and 1.5 volumes of ethanol was added to the centrifugate. The supernatant solution was then decanted, and the precipitated polysaccharide was washed with 60 percent ethanol.

After the precipitate had been washed, it was then dehydrated with 95 percent ethanol and dried in a vacuum oven to give an overall yield of 12 percent polysaccharide.

If desired, the ethanol-washed product, before drying may be washed with a mixture of 0.1 N hydrochloric acid, 2 parts, and ethanol, 3 parts, in order to remove ash and any undesirable odor. This step is then followed by a 60 percent ethanol wash, dehydration, and drying, as above.

We claim:
1. The method comprising extracting comminuted sweet corn with water to produce an extract containing polysaccharides, separating the thus formed extract, subjecting said extract to a temperature of from 105° C. to 140° C. to coagulate contained protein impurities, as evidenced by the formation of protein curds, separating the coagulated protein from the thus treated solution, adjusting the pH of said solution within the range of 8.0 to 10.0 and adding sufficient ethanol to precipitate said polysaccharides, and recovering said polysaccharides.

2. The method comprising extracting comminuted sweet corn with water to produce an extract containing polysaccharides and proteinaceous impurities, separating the extract and subjecting it to a temperature of 105° C. to 140° C. for a period of time sufficient to coagulate proteins from solution, separating the coagulated protein and precipitating sweet corn polysaccharides from the extract by the addition of a lower aliphatic alcohol at pH 8.0 to 10.0, and recovering said polysaccharides.

3. The method comprising extracting ground sweet corn with water, autoclaving the extract at 105° C. to 140° C. for 15 minutes to 3 hours, the longer time corresponding to the lower temperature, separating coagulated protein, adjusting the pH to 8.0 to 10.0 by the addition of soluble alkali, adding a lower aliphatic alcohol to precipitate the polysaccharide, separating the thus precipitated polysaccharide and washing it with alcohol and drying it.

4. The method of claim 3 in which the alcohol washed polysaccharide is rewashed with a mixture of alcohol and a mineral acid.

5. In a method for recovering polysaccharides from sweet corn which comprises extracting ground sweet corn with water and subsequently recovering polysaccharides from the resulting extract, the improvement which comprises coagulating proteins present in the extract by heating said extract to 105° C. to 140° C., and subsequently precipitating the polysaccharides with a lower aliphatic alcohol at a pH of from 8.0 to 10.0.

References Cited in the file of this patent

UNITED STATES PATENTS

| | | |
|---|---|---|
| 58,824 | Hirsch | Oct. 16, 1866 |
| 2,431,309 | Coles | Nov. 25, 1947 |
| 2,450,717 | Coles | Oct. 5, 1948 |
| 2,555,356 | Marchand | June 5, 1951 |

OTHER REFERENCES

Willaman: J. of Biol. Chem., vol. 51, pp. 275 to 283, 1922. Copy in Library.

Kerr: "Chemistry and Industry of Starch," p. 27, 1944. Copy in Division 43.